United States Patent Office 3,021,003
Patented Feb. 13, 1962

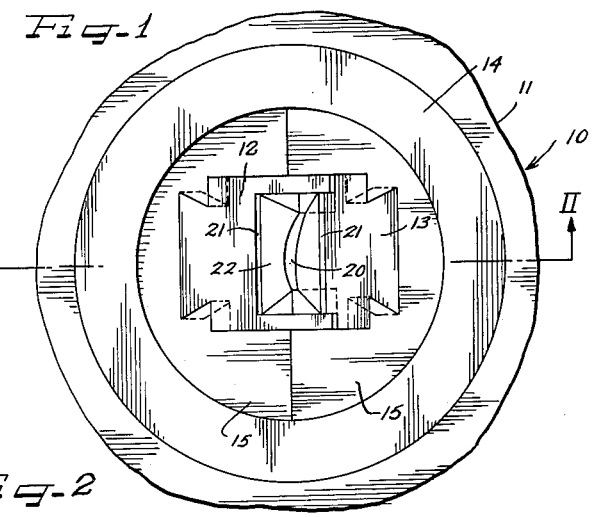
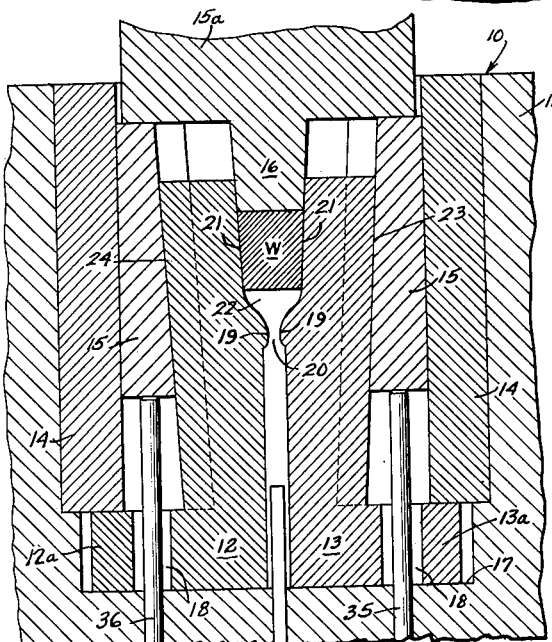
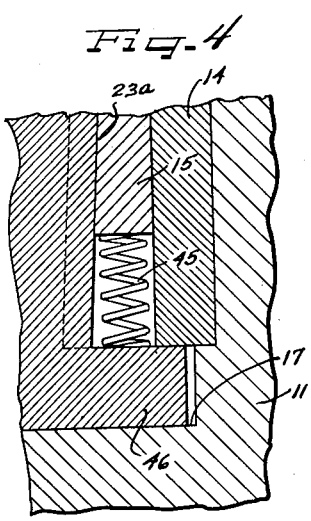
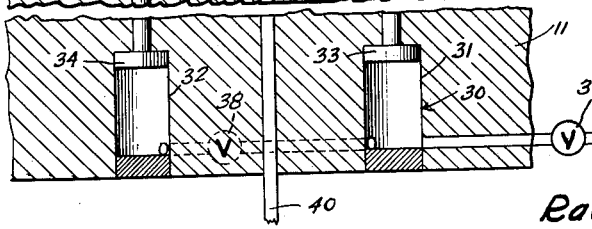

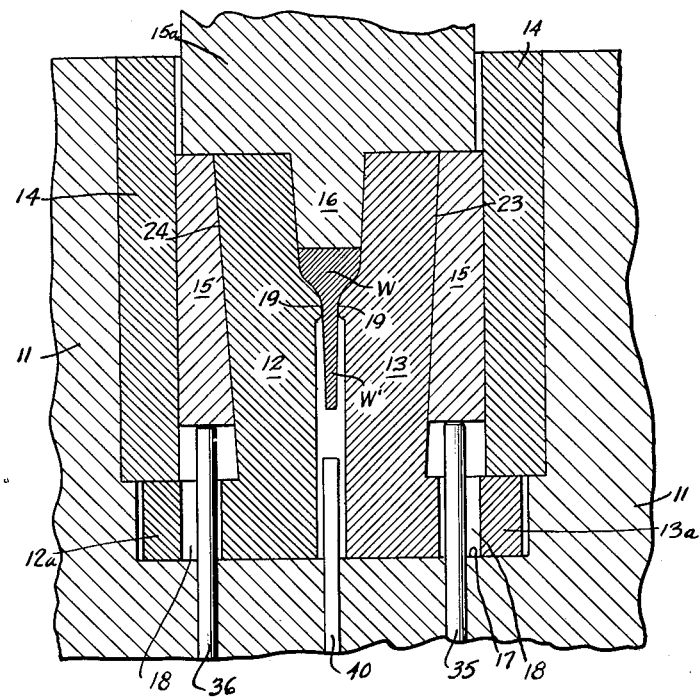
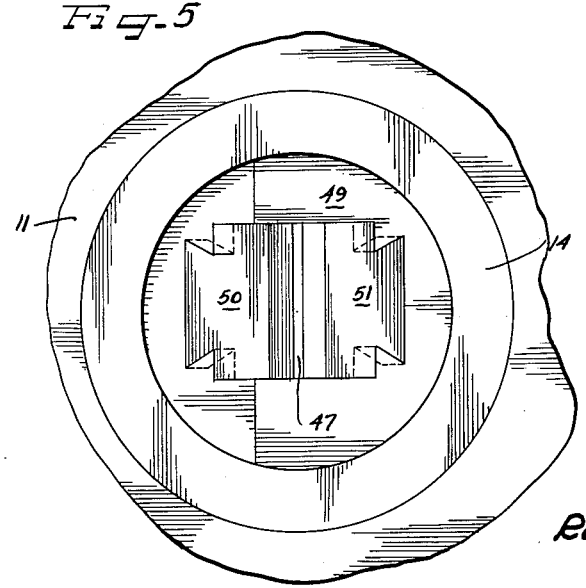
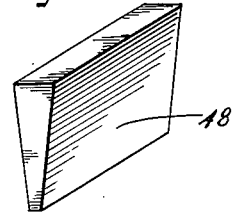

3,021,003
EXTRUSION DEVICE
Raymond M. Bluck, Euclid, Ohio, assignor to Thompson Ramo Wooldridge Inc., a corporation of Ohio
Filed Feb. 21, 1958, Ser. No. 716,611
6 Claims. (Cl. 207—2)

This invention relates generally to extrusion dies, and more specifically to an improved extrusion die for extruding workpieces having a tapered portion produced by extrusion.

Although the principles of the present invention may be included in various extrusion devices, a particularly useful application is made in extrusion die assemblies that require the extrusion of tapered workpieces, such as turbine buckets.

The present invention contemplates the utilization of a movably supported die which, in combination with a second die, jointly defines an extrusion die opening, the size of which may be increased by moving at least one of the dies in response to movement of the press ram. As the workpiece is thus advanced, the die size is increased, thereby producing a corresponding taper in the workpiece.

Accordingly, it is an object of the present invention to provide an extrusion die which is capable of extruding workpieces having tapered extruded sections.

Yet another object of the present invention is to provide an extrusion die assembly wherein the dies are held open after the press ram has been retracted so that the finished workpiece may be readily removed from the die assembly.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

On the drawings:

FIGURE 1 is a fragmentary top view of an extrusion die assembly provided in accordance with the principles of the present invention;

FIGURE 2 is a sectional view taken along line II—II of FIGURE 1, partly in elevation, and partly schematic, with parts added;

FIGURE 3 is a fragmentary portion of FIGURE 2 illustrating the relationship of the components at the end of the working stroke;

FIGURE 4 is a fragmentary view of a portion of FIGURE 2 showing a slightly modified form of this embodiment;

FIGURE 5 is a top view, generally similar to FIGURE 1, showing a pair of modified die-blocks; and FIGURE 6 is a perspective view of a workpiece extruded by the dies shown in FIGURE 5.

As shown on the drawings:

The principles of this invention are particularly useful when embodied in an extrusion die assembly such as illustrated in FIGURE 1, generally indicated by the numeral 10. This view is taken looking at the top of the die assembly, from a position intermediate the ram of the press and the die elements. The die assembly 10 includes a holder 11, a pair of dies or die-blocks 12, 13, a retainer ring 14, and a cam-block 15, here shown as being of two-piece construction.

Referring now to FIGURE 2, the holder 11 is shown to include a circular cavity within which the various other elements of the die assembly are disposed. The holder 11 is adapted to be supported by the bed of any conventional press, and it may comprise integral parts thereof. The press also includes a ram 15a having a punch or plunger 16 projecting therefrom in the path of the movement of the reciprocable ram 15a. At the bottom of the cavity, the holder 11 has a hardened smooth bearing surface 17 on which the die-blocks 12 and 13 are slidably supported. The die-blocks 12 and 13 each have a base portion 12a, 13a respectively, each of which has an aperture or opening 18 therein. It will be noted that the bearing surface 17 is in engagement with the portions 12a, 13a, which portions together have a slightly smaller area than the surface 17.

Each of the die-blocks 12, 13 has a face confronting the other which is adapted as at 19 to jointly and cooperatively define an opening 20, the opening or aperture 20 having a configuration corresponding to the transverse section of the extruded workpiece W' as best seen in FIGURE 3.

Thus, one or both faces which define the aperture 20 may be provided with a groove or appropriate configuration. The upper ends of the faces comprising walls 21, are adapted to engage the workpiece blank W to be extruded, as best shown in FIGURE 2, and to this end, the upper ends of the faces jointly define a recess 22 within which the non-extruded workpiece blank is initially disposed, and which receives the plunger 16. In the instant embodiment, the outer periphery of the plunger 16 and the inner surface of the recess 22 are complementally tapered so that the face of each of the die-blocks 12 and 13 is parallel to the opposite side thereof. The opposite sides of the die-blocks 12, 13 present a pair of cam faces or surfaces 23, 24 respectively which are engaged by the cam-block 15. In this embodiment, the die-blocks 12 and 13 have been provided with longitudinally extending grooves into which grooves are received dove-tailed portions of the cam-block 15.

The cam-block 15 extends in a direction parallel to its axis for a distance beyond the die-blocks 12, 13 for engagement with the ram 15a of the press.

The retaining ring 14 is disposed within the cavity of the holder 11 to jointly define with the bearing surface 17 a transversely directed slot within which the portions 12a, 13a of the die-blocks 12, 13 are slidably disposed. The retaining ring 14 is held in the holder 11 in any conventional rigid manner, the manner here illustrated being a press fit. If desired, the retaining ring 14 may extend in a direction parallel to its axis as shown intermediate the cam-block 15 and the holder 11, and thus provide bearing surfaces for the outside of the cam-block 15, which surfaces react therewith when the block 15 is made as two separate pieces.

It will be noted that when the cam-block 15 is moved in a direction parallel to its axis toward the surface 17, it will permit the die-blocks 12 and 13 to be spread apart from each other. When the dove-tail is provided as shown, such moving of the cam-block 15 will actually draw the die-blocks 12 and 13 apart from each other. To this end, the cam-block 15 is provided with wedge-shaped sections as shown in FIGURE 2, it being understood that the intermediate portions need not be tapered, as best seen in FIGURE 1.

It is also preferable to provide a means generally indicated at 30 for applying a force urging the die-blocks 12, 13 together. To this end, this embodiment includes a pair of cylinders 31, 32 here shown as being integral with the holder 11. Within each of the cylinders 31, 32, there is provided a piston 33, 34 having a rod 35, 36 respectively projecting through the openings 18 in the die-blocks 12, 13 and engaging the two halves of the cam-block 15. The cylinders 31, 32 are provided with a source of fluid pressure which may be controlled by a valve 37. A second valve 38 may also be provided to restrict or preclude the flow to the cylinder 32.

It is also preferable to include an ejector pin 40 slidably guided in the holder 11 in alignment with the opening 20 for engaging the extruded end of the finished workpiece W' to move the workpiece W' in a direction opposite to the power stroke of the ram 15a.

Referring to FIGURE 1, it will be noted that the die-block 12 has a portion adjacent the opening 20 which overlaps the die-block 13, here shown in broken lines. When the die-blocks 12 and 13 are separated, the overlapping portion continues to define the ends of the opening 20.

When the die assembly 10 is to be used, the ram 15a and plunger 16 are retracted to permit the insertion of the workpiece blank W into the recess 22, and then the ram 15a and the plunger 16 are advanced to a preliminary starting position such as shown in FIGURE 2.

Continued advancement of the ram 15a constitutes the power stroke and forces the workpiece blank W through the remainder of the recess 22 through the opening 20.

Simultaneously therewith, the advancement of the ram 15a also forces the cam-block 15 in a direction parallel to its axis against the oppositely directed biasing force provided by the means 30 thereagainst. This movement of the cam-block 15 toward the surface 17 lessens the effective thickness thereof, whereby the die-blocks 12 and 13 are permitted to move apart from each other, the pressure within the recess 22 causing such movement. In addition, where dove-tails are provided as herein, the dove-tails also cooperate to retract the die-blocks 12 and 13 from each other.

Since the walls 21 of the recess 22 are tapered to be parallel with the cam surfaces 23 and 24, no gap is created around the plunger 16 with respect to the walls 21. Of course, the configuration of the plunnger 16 may also act to effectuate the separation of the dies 12 and 13 in response to the movement of the ram 15a.

Thus it can be seen that as the plunger 16 is advanced into the recess 22, the width of the opening 20 is gradually increased in proportion to the amount of such movement, thereby producing a tapered section on the workpiece W' as best shown in FIGURE 3, which illustrates the end of the power stroke.

It will be noted that the size of the openings 18 is sufficient to permit the separating or lateral movement of the die-blocks 12 and 13 without interfering with the piston rods 35 and 36, and that the size of the bearing surface 17 is such that the die-blocks 12 and 13 may move thereon as required.

During the movement of the cam-blocks 15 toward the surface 17, the reactive force provided by the means 30 prevents the blocks 15 from being moved downward at a rate exceeding that of the ram 15a.

During the movement of the cam-block 15 toward the the surface 17, the fluid in the cylinders 31 and 32 is compressed and/or displaced outwardly thereof. At the end of the power stroke with the parts oriented as shown in FIGURE 3, the valve 37 may be moved to a closed position. Upon retraction of the ram 15a from the holder 11, the remaining movable parts retain their position as shown in FIGURE 3 whereby the ejector pin 40 may be actuated for the removal of the finished workpiece W' in a direction corresponding to the return stroke of the ram 15a.

When the finished workpiece W' has been removed, the valve 37 may again be opened to effect movement of the cam-block 15 in a direction away from surface 17, and thereby effect movement of the die blocks 12 and 13 together, after which another unextruded workpiece blank W may be inserted in the recess 22.

By appropriate relative sizing of pipes and restrictions, the valve 38 may be used to balance the fluid forces acting on opposite sides of the cam-block 15.

Various means may be provided to supply a reactive force to the cam-block 15. Another of such means which may be efficiently utilized includes mechanical springs. One mode of utilizing mechanical springs to this end is shown in FIGURE 4, wherein a spring 45 acts between a slidable die-block 46 and the cam-block 15 to urge the cam block 15 between the retainer ring 14 and a cam face 23a, thereby urging the die-block 46 to the left as shown.

Referring to FIGURES 5 and 6, there is shown a slight modification of the faces of the die-blocks. In this embodiment, a pair of die-blocks 50 and 51 are supported as previously described within a two-piece cam-block 49. An opening 47 is jointly defined by the confronting faces of the die-blocks 50 and 51, and by portions of the cam-block 49 immediately adjacent to the opening 47. It is thus to be understood that the transverse sectional configuration of the workpiece W' being extruded may be defined by the die-blocks alone as shown in FIGURE 1, and may be defined jointly therewith by the cam-block 49.

FIGURE 6 is an enlarged illustration of a workpiece 48 which may be extruded using a die-assembly constructed in accordance with principles shown in FIGURE 5.

It can be seen that tapered parts of numerous configurations may be extruded which heretofore could be manufactured solely by forging, casting, rolling, or machining. More specifically, the invention disclosed herein makes it possible to achieve non-uniform stock distribution as is required in the manufacture of relatively complex shaped parts such as jet engine blades and buckets.

Although various minor modifications might be suggested by those versed in the art, it should be understood that I wish to embody within the scope of the patent warranted hereon all such embodiments as reasonably and properly come within the scope of my contribution to the art.

I claim as my invention:

1. An extrusion die assembly for use between the bed and reciprocable ram of a press, comprising in combination: a pair of die blocks having spaced extrusion faces jointly defining an opening corresponding to the transverse section of the extruded workpiece, said extrusion faces each blending smoothly into confronting tapered walls which define a workpiece-blank-receiving recess; means reactively supporting said die blocks in such manner that at least one of said die blocks is movable toward and away from the other of said die blocks; and a plunger adapted to be reciprocated by the ram into, and to close one end of, said recess and to act against the end of the workpiece blank opposite to said die opening, said plunger being receivable between said die blocks, and having tapered side surfaces complemental to said tapered walls of said die blocks and slidably engageable therewith while said plunger engages the workpiece blank.

2. An extrusion die assembly for use between the bed and reciprocable ram of a press, comprising in combination: a pair of die blocks jointly defining an opening corresponding to the transverse section of the extruded workpiece, said die blocks each being movable toward and away from each other; a non-rotatable cam block encircling and supporting said die blocks, said cam block being directly drivably engageable by the press ram and movable therewith in the direction that the workpiece is extruded and having camming engagement with said die blocks for regulating movement thereof; yieldable means, operatively independent of the ram, engaging the cam block remotely from said die blocks and operable to continuously apply a force to said cam block in such direction that said cam block is normally displaced thereby toward the ram; and a plunger independent of said cam block and adapted to be reciprocated by the ram against the workpiece blank and said die blocks to be forced between said die blocks.

3. An extrusion die assembly for use between the bed and reciprocable ram of a press, comprising in combination: a pair of die blocks having spaced extrusion faces jointly defining an opening corresponding to the transverse section of the extruded workpiece, said extrusion faces each blending smoothly into confronting tapered walls which define a workpiece-blank-receiving recess, said die blocks each being movable toward and away from each other; a non-rotatable cam block encircling and supporting said die blocks, said cam block being directly drivably engageable by the press ram and movable therewith in the direction that the workpiece is extruded, and having camming engagement with said die blocks for regulating movement thereof; yieldable means, operatively independent of the ram, engaging the cam block remotely from said die blocks and operable to continuously apply a force to said cam block in such direction that said cam block is normally displaced thereby toward the ram; and a plunger independent of said cam block and adapted to be reciprocated by the ram against the workpiece blank and said die blocks, said plunger being receivable between said die blocks, and having tapered side surfaces complemental to said tapered walls of said die blocks and slidably engageable therewith while said plunger engages the workpiece blank.

4. An extrusion die assembly for use between the bed and reciprocable ram of a press, comprising in combination: a pair of die blocks jointly defining an opening corresponding to the transverse section of the extruded workpiece, at least one of said die blocks being movable toward and away from the other; a cam block supporting at least said one of said die blocks, said cam block being directly engageable drivably by the press ram and movable therewith in the direction that the workpiece is extruded, and having camming engagement with such of said die blocks as are movable for regulating movement thereof; at least one piston rod engaging said cam block remotely from said die blocks; yieldable hydraulic means operatively independent of the ram adapted to continuously apply a force through said piston rod to said cam block in such direction that said cam block is normally displayed thereby toward the ram, said hydraulic means including valve means adapted to be selectively controlled, said valve means being so disposed that said force may be terminated for an interval beginning at the end of the ram's power stroke, whereby said cam block will not be urged toward the ram during said interval; and a plunger independent of said cam block and adapted to be reciprocated by the ram against the workpiece blank and said die blocks to be forced between and against said die blocks.

5. An extrusion die assembly for use between the bed and reciprocable ram of a press, comprising in combination: a holder adapted to be supported by the press bed, said holder having a bearing surface; a pair of die blocks jointly defining an opening corresponding to the transverse section of the extruded workpiece, at least one of said die blocks being slidably supported on said bearing surface and movable toward and away from the other of said die blocks; a retainer ring rigidly secured to said holder and disposed within said holder in spaced relation to said bearing surface with its axis perpendicular thereto, the adjacent end of said ring being parallel to and spaced in a direction parallel to its axis from said bearing surface; said one die block having a portion thereof extending in a direction parallel to the axis of and disposed within said ring and having a base portion disposed between said end of said ring and said bearing surface in slidable engagement with said end of said ring and said bearing surface; a cam block slidably disposed within said retainer ring between the inner surface thereof and said one die block and spaced in a direction parallel to the axis of said ring from said base portion and adapted to wedgingly engage said retainer ring and said die block; means acting on said cam block to reciprocate it; and a plunger adapted to be reciprocated by the ram against the workpiece blank to force it between said die blocks.

6. An extrusion die assembly for use between the bed and reciprocable ram of a press, comprising in combination: a holder adapted to be supported by the press bed, said holder having a bearing surface; a pair of die blocks having spaced extrusion faces jointly defining an opening corresponding to the transverse section of the extruded workpiece, said extrusion faces each blending smoothly into confronting tapered walls which define a workpiece-blank-receiving recess, said die blocks being slidably supported on said bearing surface and movable toward and away from each other; a retainer ring rigidly secured to said holder and disposed within said holder in spaced relation to said bearing surface with its axis perpendicular thereto, the adjacent end of said ring being parallel to and spaced in a direction parallel to its axis from said bearing surface; said die blocks each having a portion thereof extending in a direction parallel to the axis of and disposed within said ring, and each having a base portion disposed between said end of said ring and said bearing surface in slidable engagement with said end of said ring and said bearing surface; a non-rotatable cam block slidably disposed within said retainer ring and encircling and supporting said die blocks and spaced in a direction parallel to the axis of said ring from said base portion of each of said die blocks, said cam block being directly engageable by the press ram and having wedging engagement with said retainer ring and said die blocks for regulating movement of said die blocks; at least one piston rod engaging said cam block remotely from said die blocks; yieldable hydraulic means operatively independent of the ram adapted to continuously apply a force through said piston rods to said cam block in such direction that said cam block is normally displaced thereby toward the ram, said hydraulic means including valve means adapted to be selectively controlled, said valve means being so disposed that said force may be terminated for an interval beginning at the end of the ram's power stroke, whereby said cam block will not be urged toward the ram during said interval; and a plunger independent of said cam block and adapted to be reciprocated by the ram against the workpiece blank and said die blocks, said plunger being receivable between said die blocks, and having tapered side surfaces complemental to said tapered walls of said die blocks and slidably engageable therewith while said plunger engages the workpiece blank.

References Cited in the file of this patent

UNITED STATES PATENTS

| | | |
|---|---|---|
| 369,594 | Dalzell | Sept. 6, 1887 |
| 2,231,336 | Heron | Feb. 11, 1941 |
| 2,335,590 | Gersman | Nov. 30, 1943 |
| 2,365,482 | Manken et al. | Dec. 19, 1944 |
| 2,389,876 | Sequin | Nov. 27, 1945 |
| 2,392,336 | Nissen | Jan. 8, 1946 |
| 2,748,934 | Wheeler | June 5, 1956 |

FOREIGN PATENTS

| | | |
|---|---|---|
| 518,037 | Great Britain | Feb. 15, 1940 |